United States Patent
Chen et al.

(10) Patent No.: US 11,507,221 B2
(45) Date of Patent: Nov. 22, 2022

(54) ANALOG FRONT END CIRCUIT FOR TOUCH CONTROLLER AND OPERATING METHOD THEREOF

(71) Applicant: Novatek Microelectronics Corp., Hsinchu (TW)

(72) Inventors: Hung-Kai Chen, Taipei (TW); Yu-Huang Chen, Tainan (TW); Feng-Lin Chan, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/211,864

(22) Filed: Mar. 25, 2021

(65) Prior Publication Data

US 2021/0255752 A1 Aug. 19, 2021

Related U.S. Application Data

(63) Continuation-in-part of application No. 16/897,290, filed on Jun. 10, 2020, now abandoned.

(Continued)

(30) Foreign Application Priority Data

Dec. 10, 2020 (TW) ................................. 109143649

(51) Int. Cl.
*G06F 3/041* (2006.01)
*G06F 3/044* (2006.01)

(52) U.S. Cl.
CPC .......... *G06F 3/04164* (2019.05); *G06F 3/044* (2013.01)

(58) Field of Classification Search
None
See application file for complete search history.

(56) References Cited

U.S. PATENT DOCUMENTS

| | | |
|---|---|---|
| 7,414,552 B2 | 8/2008 | Chou |
| 10,382,054 B2 | 8/2019 | Bohannon |

(Continued)

FOREIGN PATENT DOCUMENTS

| | | |
|---|---|---|
| CN | 109766031 | 5/2019 |
| TW | I259661 | 8/2006 |
| TW | 201734737 | 10/2017 |

OTHER PUBLICATIONS

"Office Action of Taiwan Counterpart Application", dated Nov. 9, 2021, p. 1-p. 4.

(Continued)

*Primary Examiner* — Stephen T. Reed
(74) *Attorney, Agent, or Firm* — JCIPRNET (57) ABSTRACT

An analog front-end circuit for a touch controller and an operating method thereof are provided. The analog front-end circuit includes an analog front-end, a first switch and a second switch. The analog front-end includes an input terminal and an output terminal. The first switch includes a first terminal and a second terminal. The first terminal of the first switch is coupled to the input terminal of the analog front-end, and the second terminal of the first switch is coupled to a panel routing. The second switch includes a first terminal and a second terminal. The first terminal of the second switch is coupled to the second terminal of the first switch, and the second terminal of the second switch is coupled to a reference voltage.

31 Claims, 7 Drawing Sheets

Related U.S. Application Data

(60) Provisional application No. 62/976,299, filed on Feb. 13, 2020.

(56) References Cited

U.S. PATENT DOCUMENTS

| | | |
|---|---|---|
| 2005/0151677 A1 | 7/2005 | Chou |
| 2016/0124544 A1* | 5/2016 | Kang .................. G06F 3/03547 |
| | | 345/174 |
| 2017/0205948 A1 | 7/2017 | Erdogan et al. |
| 2017/0285862 A1* | 10/2017 | Hu ............................ G05F 3/08 |
| 2019/0149163 A1 | 5/2019 | Bohannon |

OTHER PUBLICATIONS

"Office Action of Taiwan Counterpart Application", dated Jan. 28, 2022, p. 1-p. 6.

* cited by examiner

ANALOG FRONT END CIRCUIT FOR TOUCH CONTROLLER AND OPERATING METHOD THEREOF

CROSS-REFERENCE TO RELATED APPLICATION

This application is a continuation-in-part application of and claims the priority benefit of a prior application Ser. No. 16/897,290, filed on Jun. 10, 2020, which claims the priority benefit of U.S. provisional application Ser. No. 62/976,299, filed on Feb. 13, 2020. This application also claims the priority benefit of Taiwan application serial no. 109143649, filed on Dec. 10, 2020. The entirety of the above-mentioned patent application is hereby incorporated by reference herein and made a part of this specification.

BACKGROUND

Technical Field

The disclosure generally relates to a function circuit in a touch controller, in particular, to an analog front-end circuit for touch controller and an operating method thereof.

Description of Related Art

Figure 1:
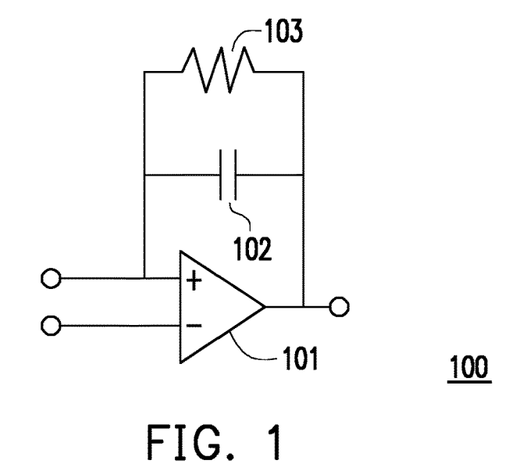
FIG. 1 is a schematic diagram illustrating a conventional analog front-end circuit.

Referring to FIG. 1, the conventional analog front-end circuit 100 for a general touch controller may include, for example, an amplifier 101, a capacitor 102 and a resistor 103. The capacitor 102 and the resistor 103 are respectively coupled between an inverting input terminal and an output terminal of the amplifier 101. For the general touch controller, the conventional analog front-end circuit 100 may be configured to receive a touch signal provided by a touch sensor through the inverting input terminal of the amplifier 101, and receive a reference voltage through a non-inverting input terminal of the amplifier 101. Thus, the amplifier 101 may output an output signal according to the touch signal and the reference voltage. However, if the touch controller is used for receiving the touch signal from a display touch module having a display panel and a touch panel, the amplifier 101 may receive the touch signal provided by the touch panel with coupling noise signals from the display panel. In other words, the output signal outputted by the amplifier 101 may have signal distortion problems causing by the coupling noise signals from the display panel, thus may further render the analog front-end circuit 100 to be ineffective. Therefore, regarding how to design a new analog front-end circuit having a signal-to-noise ratio, solutions of several embodiments are provided below.

SUMMARY

The disclosure is directed to an analog front-end circuit for a touch controller and an operating method thereof capable of providing effective touch sensing function.

The analog front-end circuit for a touch controller of an embodiment of the disclosure includes an analog front-end, a first switch and a second switch. The analog front-end includes an input terminal and an output terminal. The first switch includes a first terminal and a second terminal. The first terminal of the first switch is coupled to the input terminal of the analog front-end and the second terminal of the first switch is coupled to the panel routing. The second switch includes a first terminal and a second terminal. The first terminal of the second switch is coupled to the second terminal of the first switch and the second terminal of the second switch is coupled to a reference voltage.

The operating method of another embodiment of the disclosure is adapted to an analog front-end circuit for a touch controller. The analog front-end circuit includes an analog front-end, a first switch and a second switch. An input terminal of the analog front-end is coupled to a first terminal of the first switch. A second terminal of the first switch is coupled to a panel routing and a first terminal of the second switch. A second terminal of the second switch is coupled to a reference voltage. The panel routing is further coupled to a touch panel and a display panel. The operating method includes following steps: turning on the second switch during a first period; transmitting a coupling noise signal from the display panel through the panel routing and the second switch to the reference voltage during the first period; turning on the first switch during a second period; and receiving a touch driving signal of the touch panel by the input terminal of the analog front-end through the panel routing and the first switch during the second period. The first period and the second period are non-overlapping.

Based on the above, according to the analog front-end circuit for the touch controller and the operating method thereof of the disclosure, the analog front-end circuit can effectively avoid or reduce to receive the noise signal generated by the display panel when the analog front-end circuit receives the touch driving signal.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 2:
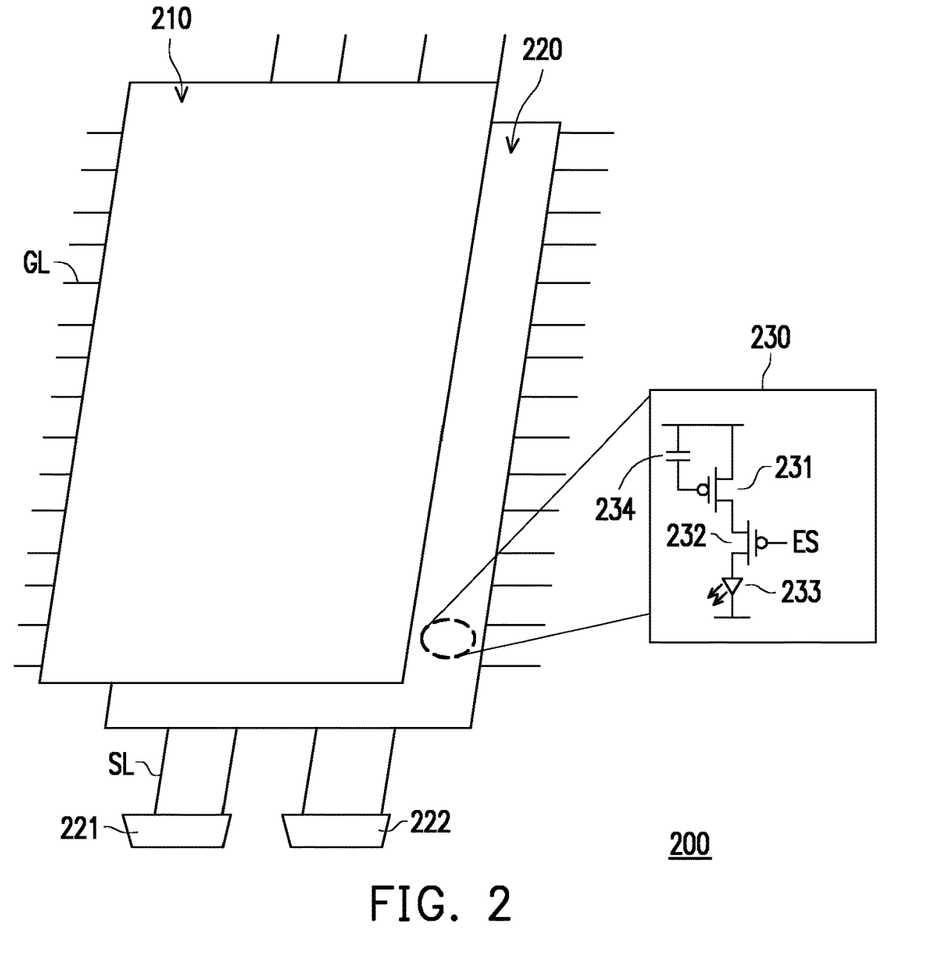
FIG. 2 is a schematic diagram illustrating a touch display module according to an embodiment of the disclosure.

FIG. 2 is a schematic diagram illustrating a touch display module according to an embodiment of the disclosure. Referring to FIG. 2, the touch display module 200 of the disclosure includes a touch panel 210 and a display panel 220, and the touch panel 210 is disposed on the display panel 220. In the embodiment of the disclosure, the touch panel 210 includes a plurality of touch sensors arranged in an array. In the embodiment of the disclosure, the touch panel 210 may be a mutual capacitance touch panel or a self-capacitance touch panel. The display panel 220 may be a light-emitting diode (LED) display panel, a micro LED display panel, an organic light-emitting diode (OLED) display panel, a liquid-crystal display (LCD) panel or other types of display panels, and includes a plurality of pixel units arranged in an array. The pixel units of the display panel 220 are driven by a plurality gate lines GS and a plurality of source lines SL, wherein the source lines SL may be further coupled to multiplexers 221, 222. The multiplexers 221, 222 may respectively be coupled to respective two source lines, and configured to respectively and alternately drive the respective two source lines.

In the embodiment of the disclosure, each of the pixel units of the display panel 220 may like a pixel unit 230 shown in FIG. 2. The pixel unit 230 includes transistors 231, 232, a light-emitting unit 233 and a capacitor 234. A first terminal of the transistor 231 is coupled to a high level power supply voltage ELVDD, and a second terminal of the transistor 231 is coupled to a first terminal of the transistor 232. A second terminal of the transistor 232 is coupled to a first terminal of the light-emitting unit 233, and a second terminal of the light-emitting unit 233 is coupled to a low level power supply voltage ELVSS. The capacitor 234 is coupled between the high level power supply voltage ELVDD and a control terminal of the transistor 231. In the embodiment of the disclosure, a control terminal of the transistor 232 is configured to receive an emission signal ES and drive the light-emitting unit 233 according to the emission signal ES.

Figure 3A:
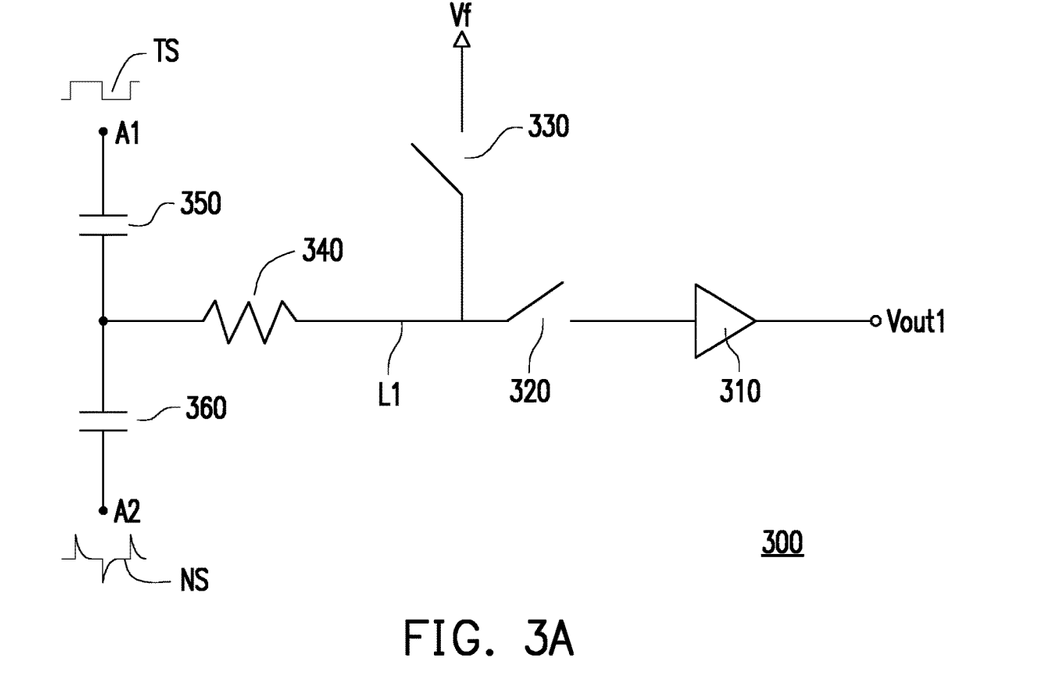
FIG. 3A is a schematic diagram illustrating an analog front-end circuit adapted to the mutual capacitance touch panel according to an embodiment of the disclosure.

FIG. 3A is a schematic diagram illustrating an analog front-end circuit adapted to the mutual capacitance touch panel according to an embodiment of the disclosure. Referring to FIG. 3, the analog front-end circuit 300 may be disposed in a touch controller for receiving a touch driving signal TS from a sense capacitance (for example, mutual inductance capacitance) of the touch panel 210 of FIG. 2, and the touch controller may further include other function circuits, such as display driver for driving the display panel 220 of FIG. 2. In the embodiment of the disclosure, the analog front-end circuit 300 includes an analog front-end 310, a first switch 320 and a second switch 330. The analog front-end 310 includes an input terminal and an output terminal. The first switch 320 includes a first terminal and a second terminal. The first terminal of the first switch 320 is coupled to the input terminal of the analog front-end 310, and the second terminal of the first switch is coupled to a panel routing L1, wherein the panel routing L1 has an equivalent resistance 340. The second switch 330 includes a first terminal and a second terminal. The first terminal of the second switch 330 is coupled to the second terminal of the first switch 320, and the second terminal of the second switch 330 is coupled to a reference voltage Vf. In another embodiment of the disclosure, the reference voltage Vf may be a common mode voltage. Additionally, the analog front-end 310 of the disclosure is a signal processing circuit. The analog front-end 310 may further include other circuit units or other function circuits, such as the analog front-end circuit 100 of FIG. 1, but the disclosure is not limited thereto.

It should be noted that, the touch controller described in each embodiment of the disclosure may be integrated in a composite chip with a display driver, such as a touch and display driver integration (TDDI) chip. Alternatively, the touch controller described in each embodiment of the disclosure may be integrated in a composite chip with a fingerprint sensor driver and a display driver, such as a fingerprint, touch and display driver integration (FTDI) chip.

Referring to FIG. 2 and FIG. 3A, in the embodiment of the disclosure, the analog front-end circuit 300 may be coupled to the touch panel 210 through the panel routing L1, and there is an equivalent capacitance 350 between the panel routing L1 and the touch panel 210. One terminal of the equivalent capacitance 350 may be coupled to the equivalent resistor 340 and the panel routing L1, and another one terminal of the equivalent capacitance 350 may be coupled to the touch panel 210 through the node A1. However, owing to the touch panel 210 is integrated with the display panel 220, the analog front-end circuit 300 may also be coupled to the display panel 220 through the panel routing L1, wherein there is an equivalent capacitance 360 between the panel routing L1 and the display panel 220. One terminal of the equivalent capacitance 360 may be coupled to the equivalent resistor 340 and the panel routing L1, and another one terminal of the equivalent capacitance 360 may be coupled to the display panel 220 through the node A2. In the embodiment of the disclosure, the analog front-end 310 is configured to receive a touch driving signal TS from a touch sensor of the touch panel 210 through the panel routing L1 and the first switch 320 to the input terminal of the analog front-end 310 when the first switch 320 is turned on and the second switch 330 is turned off, so that the output terminal of the analog front-end 310 outputs an output voltage Vout1 according to the touch driving signal TS. Further, the analog front-end circuit 300 is further configured to transmit a coupling noise signal NS from the display panel 220 through the panel routing L1 and the second switch 330 to the reference voltage Vf when the second switch 330 is turned on and the first switch 320 is turned off. In other words, the analog front-end circuit 300 may prevent the analog front-end 310 from receiving the coupling noise signal NS from the display panel 220 by controlling the conduction states of the first switch 320 and the second switch 330. In addition, in one embodiment, the coupling noise signal NS may also include the interference signal provided by the fingerprint sensor.

Figure 3B:
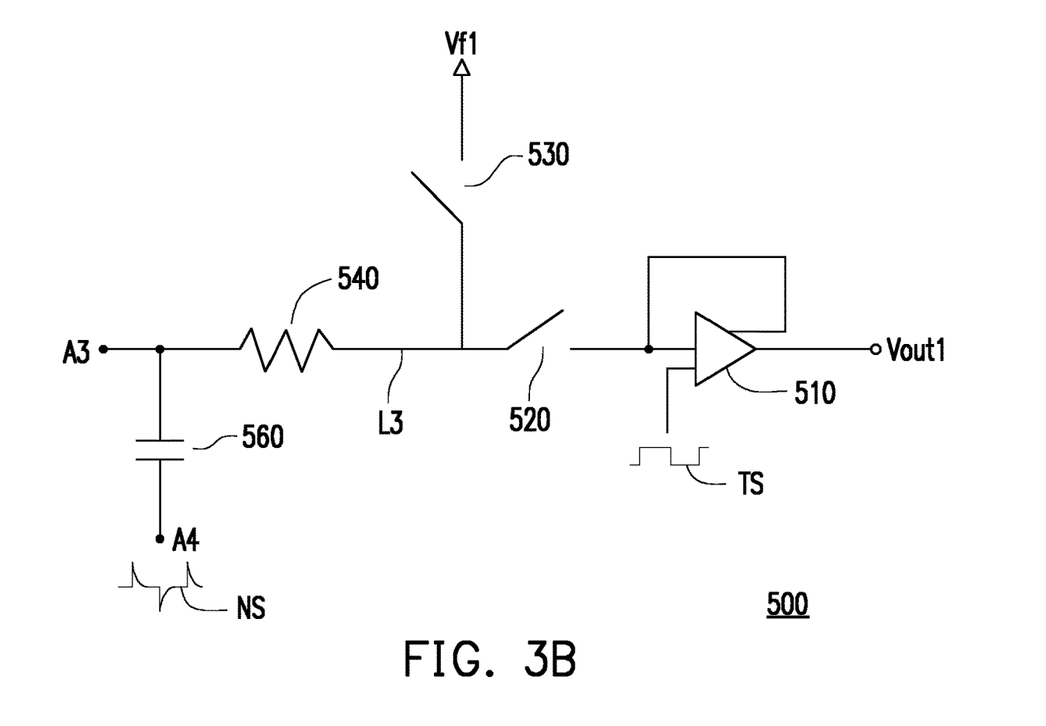
FIG. 3B is a schematic diagram illustrating an analog front-end circuit adapted to the self-capacitance touch panel according to an embodiment of the disclosure.

FIG. 3B is a schematic diagram illustrating an analog front-end circuit adapted to the self-capacitance touch panel according to an embodiment of the disclosure. Referring to FIG. 3B, the analog front-end circuit 500 may be disposed in the touch controller to send the touch driving signal TS to the touch panel 210 of FIG. 2 to sense the sense capacitance (for example, a self-capacitance) of the touch panel 210, and the touch controller may further include other functional circuits, such as a display driver for driving the display panel 220 of FIG. 2. In the embodiment of the disclosure, the analog front-end circuit 500 includes an analog front-end 510, a first switch 520, and a second switch 530. The analog front end 510 includes a first input terminal, a second input terminal, and an output terminal. The first input terminal of the analog front end 510 is coupled to the output terminal of the analog front end 510. The first switch 520 includes a first terminal and a second terminal. The first terminal of the first switch 520 is coupled to the first input terminal of the analog front end 510, and the second terminal of the first switch 520 is coupled to the panel routing L3, where the panel routing L3 has an equivalent resistance 540. The second switch 530 includes a first terminal and a second terminal. The first terminal of the second switch 530 is coupled to the second terminal of the first switch 520, and the second terminal of the second switch 530 is coupled to the reference voltage Vf1. In another embodiment of the disclosure, the reference voltage Vf1 may be the touch driving signal TS or a common mode voltage, but the disclosure is not limited thereto. In addition, the analog front end 510 of the disclosure is a signal processing circuit. The analog front end 510 may further include other circuit units or other functional circuits, such as the analog front end circuit 100 shown in FIG. 1, but the disclosure is not limited thereto.

Referring to FIG. 2 and FIG. 3B, in the embodiment of the disclosure, the analog front-end circuit 500 may be coupled to the touch panel 210 through the panel routing L3 and the node A3. Since the touch panel 210 and the display panel 220 are integrated, the analog front-end circuit 500 may also be coupled to the display panel 220 through the panel routing L3, where an equivalent capacitance 560 exists between the panel routing L3 and the display panel 220. One terminal of the equivalent capacitance 560 may be coupled to the equivalent resistor 540 and the panel routing L3, and another one terminal of the equivalent capacitance 560 may be coupled to the display panel 220 through the node A4. In the embodiment of the disclosure, the analog front end 510 is configured to receive the touch driving signal TS from the second input terminal of the analog front end 510 when the first switch 520 is turned on and the second switch 530 is turned off, and then transmit the touch driving signal TS to the touch sensor of the touch panel 210 through the first input terminal of the analog front end 510, the first switch 520, the panel routing L3, and the node A3. The output terminal of the analog front end 510 outputs the output signal Vout1 according to the touch driving signal TS induced by the voltage change of self-capacitance induction. In addition, the analog front-end circuit 500 is further used to transmit the coupling noise signal NS from the display panel 220 to the reference voltage Vf1 through the panel routing L3 and the second switch 530 when the second switch 530 is turned on and the first switch 520 is turned off. In other words, the analog front-end circuit 500 may prevent the analog front-end 510 from receiving the coupling noise signal NS by controlling the conduction state of the first switch 520 and the second switch 530.

Figure 4:
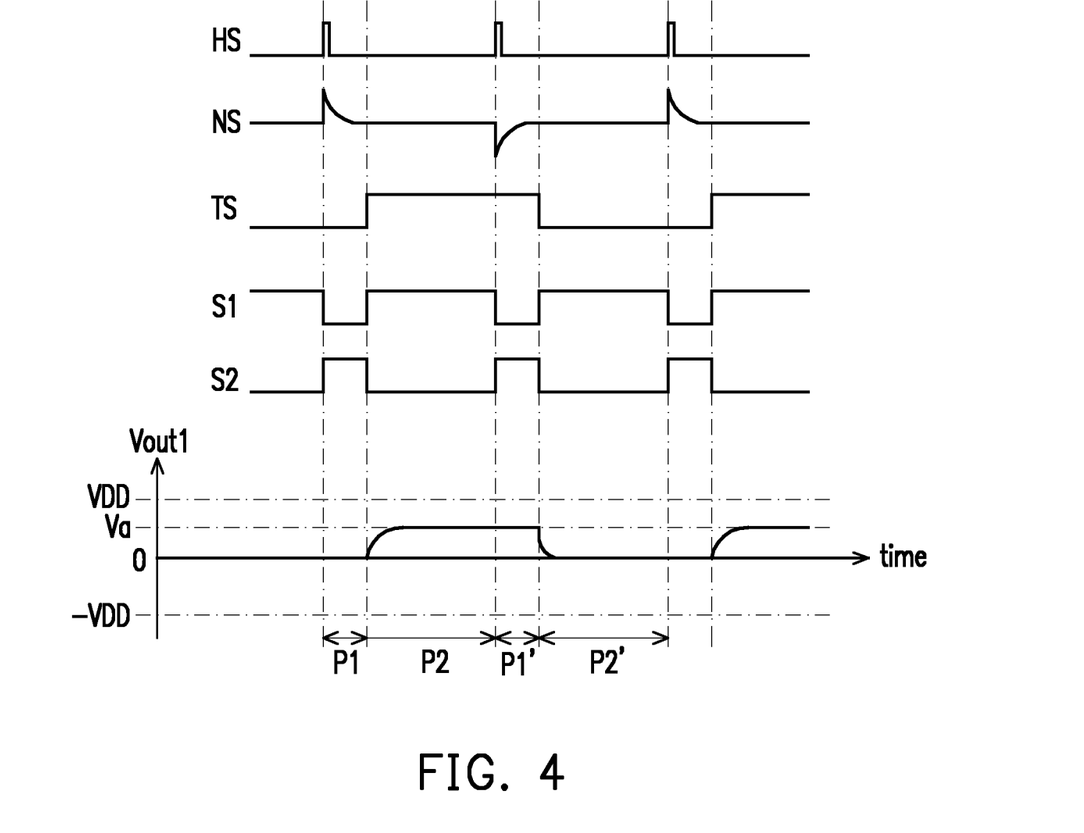
FIG. 4 is a signal waveform diagram illustrating the operation of the analog front-end circuit according to an embodiment of the disclosure.

FIG. 4 is a signal waveform diagram illustrating the operation of the analog front-end circuit according to an embodiment of the disclosure. Referring to FIG. 2, FIG. 3A and FIG. 4, the signal waveform of FIG. 4 may be applied to the analog front-end circuit 300 of FIG. 3A. In the embodiment of the disclosure, the display panel 220 may be driven by a horizontal sync signal HS, therefore the display panel 220 may synchronously generate the coupling noise signal NS to the analog front-end circuit 300. As shown in FIG. 4, each rising edge and each falling edge of the coupling noise signal NS may be synchronized with each rising edge of the horizontal sync signal HS. In the embodiment of the disclosure, a signal period of the horizontal sync signal HS is synchronized with an alternating period of each adjacent rising edge and falling edge of the touch driving signal TS, and the touch driving signal TS is shifted to prevent the analog front-end 310 from receiving the coupling noise signal NS during the period of the analog front-end 310 receiving the touch driving signal TS.

In the embodiment of the disclosure, the first switch 320 is configured to receive a first switching signal S1, and the second switch 330 is configured to receive a second switching signal S2. The first switching signal S1 and the second switching signal S2 are periodic square waves, and the first switching signal S1 and the second switching signal S2 are inverted. Thus, the second switch 330 is turned on during first periods P1, P1', and the first switch 320 is turned on during second periods P2, P2'. The first period P1 and the second period P2 are non-overlapping, and the first period P1' and the second period P2' are non-overlapping. It is should be noted that, as shown in FIG. 4, each falling edge of the first switching signal S1 is synchronized with the each rising edge of the horizontal sync signal HS and the each falling edge and the each rising edge of the coupling noise signal NS, and each rising edge of the first switching signal S1 is synchronized with the each rising edge and each falling edge of the touch driving signal TS. Thus, each rising edge of the second switching signal S2 is synchronized with the each rising edge of the horizontal sync signal HS and the each falling edge and the each rising edge of the coupling noise signal NS, and each falling edge of the second switching signal S2 is synchronized with the each rising edge and the each falling edge of the touch driving signal TS. In other words, when the coupling noise signal NS is transmitted through the panel routing L1, the first switch 320 is turned off to prevent the analog front-end 310 from receiving the coupling noise signal NS.

Therefore, as shown in FIG. 4, the analog front-end circuit 300 may release the coupling noise signal NS through the panel routing L1 and the second switch 330 to the reference voltage Vf during the first periods P1, P1', and the analog front-end 310 is configured to receive the touch driving signal TS through the panel routing L1 and the first switch 320 during the second period P2. The analog front-end 310 is configured to receive the touch driving signal TS without the coupling noise signal NS or with a relatively low coupling noise signal NS during the second period P2, so that the output terminal of the analog front-end 310 outputs an output signal Vout1 having voltage Va as shown in FIG. 4 during the second period P2. In the embodiment of the disclosure, the analog front-end 310 may continuously output the output signal Vout1 having voltage Va during a next first period P1', and the analog front-end 310 may be reset (or discharged) during a next second period P2'. It is should be noted that, the output signal Vout1 may represent the touch information of the touch sensor of the touch panel 210, wherein the output signal Vout1 may swing between the voltages 0 to Va during the periods P1 to P2'. In other words, the analog front-end circuit 300 may be operated according to the signal waveform diagram of FIG. 4, so that the analog front-end circuit 300 can output the output signal Vout1 having higher signal-to-noise ratio during the second period P2.

Referring to FIG. 2, FIG. 3B and FIG. 4, the signal waveform of FIG. 4 may also be applied to the analog front-end circuit 500 of FIG. 3B. In the embodiment of the disclosure, the display panel 220 may be driven by the horizontal synchronization signal HS, so the display panel 220 may synchronously generate the coupling noise signal NS which is transmitted to the analog front-end circuit 500. In the embodiment of the disclosure, when the coupling noise signal NS is transmitted through the panel routing L3, the first switch 520 is turned off to prevent the first end of the analog front end 510 from receiving the coupling noise signal NS. As shown in FIG. 4, the analog front end circuit 500 may release the coupling noise signal NS to the reference voltage Vf1 through the panel routing L3 and the second switch 530 during the first period P1, P1', and the second output terminal of the analog front end 510 is configured to receive the touch driving signal TS during the second period P2, so that the first output terminal of the analog front end 510 is configured to transmit the touch driving signal TS through the first switch 520, the panel wiring L3 and the node A3 to the touch panel 210 during the second period P2.

In the embodiment of the disclosure, the first terminal of the analog front end 510 is configured to transmit the touch driving signal TS to the touch panel 210 for sensing during the second period P2 without receiving coupling noise signal NS or receiving relatively low coupling noise signal NS, so that the output terminal of the analog front end 510 outputs the output signal Vout1 having the voltage Va during the second period P2. For example, the voltage Va is lower than the power supply voltage VDD. In the embodiment of the disclosure, the analog front end 510 may continuously output the output signal Vout1 with the voltage Va during the next first period P1', and may reset (or discharge) the analog front end 510 during the next second period P2'. It should be noted that, the output signal Vout1 may represent the touch information of the touch sensor of the touch panel 210, where the output signal Vout1 may swing from the voltage 0 to the voltage Va during the period P1 to the period P2'. In other words, the analog front-end circuit 500 may operate according to the signal waveform diagram of FIG. 4, so that the analog front-end circuit 500 may output the output signal Vout1 with a higher signal-to-noise ratio during the second period P2.

However, regarding the signal waveform characteristics of the present embodiment (FIG. 3B and FIG. 4), please refer to the above-mentioned embodiment (FIG. 3A and FIG. 4) to obtain sufficient teaching, suggestion, and implementation description, so there will not repeat again. In addition, FIG. 3A and FIG. 3B may have different voltage oscillations when the signal waveform of FIG. 4 is applied. The signal waveform of FIG. 4 is only used to show the relationships between the on-off switching results and the change of each signal waveform, and do not limit the analog front-end circuit 300 of FIG. 3A and the analog front-end circuit 500 of FIG. 3B to operate with the same voltage amplitude results.

Figure 5A:
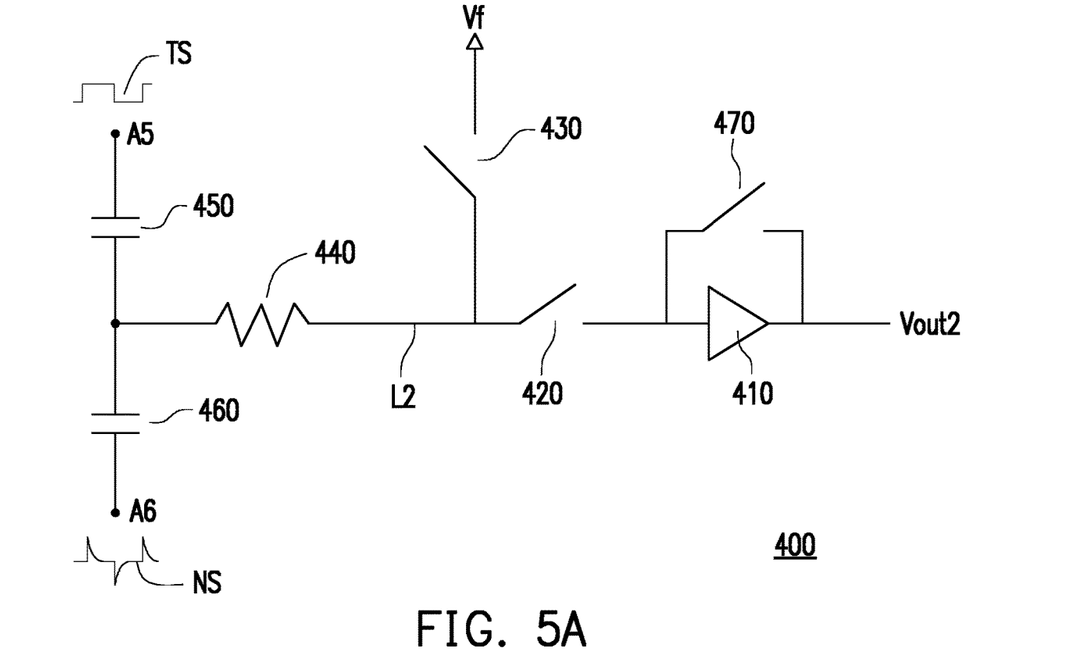
FIG. 5A is a schematic diagram illustrating an analog front-end circuit adapted to the mutual capacitance touch panel according to another embodiment of the disclosure.

FIG. 5A is a schematic diagram illustrating an analog front-end circuit adapted to the mutual capacitance touch panel according to another embodiment of the disclosure. Referring to FIG. 5A, the analog front-end circuit 400 may be disposed in a touch controller for receiving a touch driving signal TS from a sense capacitance (for example, mutual inductance capacitance) of the touch panel 210 of FIG. 2, and the touch controller may further include other function circuits, such as display driver for driving the display panel 220 of FIG. 2. In the embodiment of the disclosure, the analog front-end circuit 400 includes an analog front-end 410, a first switch 420, a second switch 430 and third switch 470. In the embodiment of the disclosure, the analog front-end 410 includes an input terminal and an output terminal. The first switch 420 includes a first terminal and a second terminal. The first terminal of the first switch 420 is coupled to the input terminal of the analog front-end 410, and the second terminal of the first switch is coupled to a panel routing L2, wherein the panel routing L2 has an equivalent resistance 440. The second switch 430 includes a first terminal and a second terminal. The first terminal of the second switch 430 is coupled to the second terminal of the first switch 420, and the second terminal of the second switch 430 is coupled to a reference voltage Vf. The third switch 470 includes a first terminal and a second terminal. The first terminal of the third switch 470 is coupled to the input terminal of the analog front-end 410 and the second terminal of the third switch 470 is coupled to the output terminal of the analog front-end 410. In the embodiment of the disclosure, the third switch 470 is switched synchronously with the second switch 430. Additionally, the analog front-end 410 of the disclosure is a signal processing circuit. The analog front-end 410 may further include other circuit units or other function circuits, such as the analog front-end circuit 100 of FIG. 1, but the disclosure is not limited thereto.

Referring to FIG. 2 and FIG. 5A, in the embodiment of the disclosure, the analog front-end circuit 400 may be coupled to the touch panel 210 through the panel routing L2, and there is an equivalent capacitance 450 between the panel routing L2 and the touch panel 210. One terminal of the equivalent capacitance 450 may be coupled to the equivalent resistor 440 and the panel routing L2, and another one terminal of the equivalent capacitance 450 may be coupled to the touch panel 210 through the node A5. However, owing to the touch panel 210 is integrated with the display panel 220, the analog front-end circuit 400 may also be coupled to the display panel 220 through the panel routing L2, wherein there is an equivalent capacitance 460 between the panel routing L2 and the display panel 220. One terminal of the equivalent capacitance 460 may be coupled to the equivalent resistor 440 and the panel routing L2, and another one terminal of the equivalent capacitance 460 may be coupled to the display panel 220 through the node A6. In the embodiment of the disclosure, the analog front-end 410 is configured to receive the touch driving signal TS from a touch sensor of the touch panel 210 through the panel routing L2 and the first switch 420 to the input terminal of the analog front-end 410 when the first switch 420 is turned on and the second switch 430 is turned off, so that the output terminal of the analog front-end 410 outputs an output voltage according to the touch driving signal TS. Further, the analog front-end circuit 400 is further configured to transmit a coupling noise signal NS from the display panel 220 through the panel routing L2 and the second switch 430 to the reference voltage Vf when the second switch 430 is turned on and the first switch 420 is turned off. In other words, the analog front-end circuit 400 may prevent the analog front-end 410 from receiving the coupling noise signal NS by controlling the conduction states of the first switch 420 and the second switch 430. Furthermore, the third switch 470 is switched synchronously with the second switch 430, and the analog front-end 410 is reset (or discharged) when the third switch 470 is turned on.

Figure 5B:
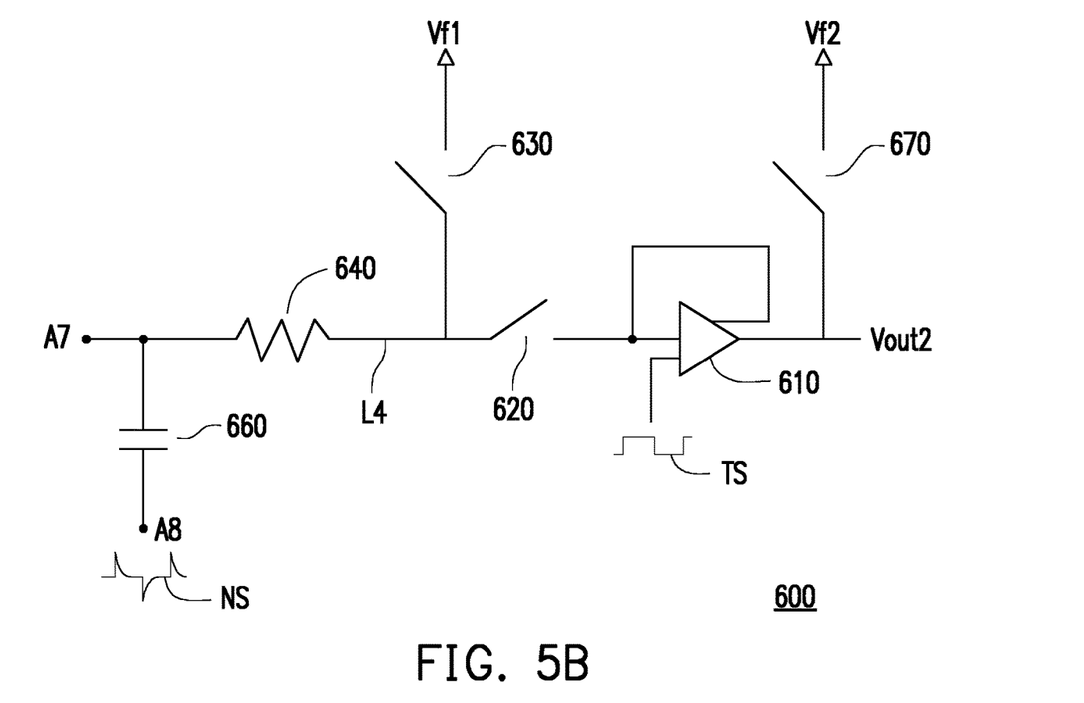
FIG. 5B is a schematic diagram illustrating an analog front-end circuit adapted to the self-capacitance touch panel according to another embodiment of the disclosure.

FIG. 5B is a schematic diagram illustrating an analog front-end circuit adapted to the self-capacitance touch panel according to another embodiment of the disclosure. Referring to FIG. 5B, the analog front-end circuit 600 may be disposed in a touch controller for sent a touch driving signal TS to the touch panel 210 of FIG. 2 to sense a sense capacitance (for example, a self-capacitance) of the touch panel 210, and the touch controller may further include other functional circuits, such as a display driver for driving the display panel 220 of FIG. 2. In the embodiment of the disclosure, the analog front-end circuit 600 includes an analog front-end 610, a first switch 620, a second switch 630 and a third switch 670. In the embodiment of the disclosure, the analog front end 610 includes a first input terminal, a second input terminal, and an output terminal. The first input terminal of the analog front end 610 is coupled to the output terminal of the analog front end 610. The first switch 620 includes a first terminal and a second terminal. The first terminal of the first switch 620 is coupled to the first input terminal of the analog front end 610, and the second terminal of the first switch 620 is coupled to the panel routing L4, where the panel routing L4 has an equivalent resistance 640. The second switch 630 includes a first terminal and a second terminal. The first terminal of the second switch 630 is coupled to the second terminal of the first switch 620, and the second terminal of the second switch 630 is coupled to the reference voltage Vf1. The third switch 670 includes a first terminal and a second terminal. The first terminal of the third switch 670 is coupled to the reference voltage Vf2, and the second terminal of the third switch 670 is coupled to the output terminal of the analog front end 610. In the embodiment of the disclosure, the third switch 670 and the second switch 630 are switched synchronously. In another embodiment of the disclosure, the reference voltages Vf1 and Vf2 may be the touch driving signal TS or the common mode voltage, but the disclosure is not limited thereto. In addition, the analog front end 610 of the disclosure is a signal processing circuit. The analog front end 610 may further include other circuit units or other functional circuits, such as the analog front end circuit 100 of FIG. 1, but the disclosure is not limited thereto.

Referring FIG. 2 and FIG. 5B, in the embodiment of the disclosure, the analog front-end circuit 600 may be coupled to the touch panel 610 through the panel routing L4 and the node A7. However, since the touch panel 210 is integrated with the display panel 220, the analog front-end circuit 600 may also be coupled to the display panel 220 through the panel routing L4, where an equivalent capacitance 660 exists between the panel routing L4 and the display panel 220. One terminal of the equivalent capacitance 660 may be coupled to the equivalent resistor 640 and the panel routing L4, and another one terminal of the equivalent capacitance 660 may be coupled to the display panel 220 through the node A8. In the embodiment of the disclosure, the analog front end 610 is configured to receive the touch driving signal TS from the second input terminal of the analog front end 610 when the first switch 620 is turned on and the second switch 630 is turned off, and then transmit the touch driving signal TS to the touch sensor of the touch panel 210 through the first input terminal of the analog front end 610, the first switch 620, the panel routing L4, and the node A7. The output terminal of the analog front end 610 outputs the output signal Vout2 according to the touch driving signal TS induced by the voltage change of self-capacitance induction. In addition, the analog front-end circuit 600 is further used to transmit the coupling noise signal NS from the display panel 220 to the reference voltage Vf1 through the panel routing L4 and the second switch 630 when the second switch 630 is turned on and the first switch 620 is turned off. In other words, the analog front-end circuit 600 may prevent the analog front-end 610 from receiving the coupling noise signal NS by controlling the conduction state of the first switch 620 and the second switch 630. In addition, the third switch 670 is switched synchronously with the second switch 630, and the output terminal of the analog front end 610 may be reset (or discharged) when the third switch 670 is turned on.

Figure 6:
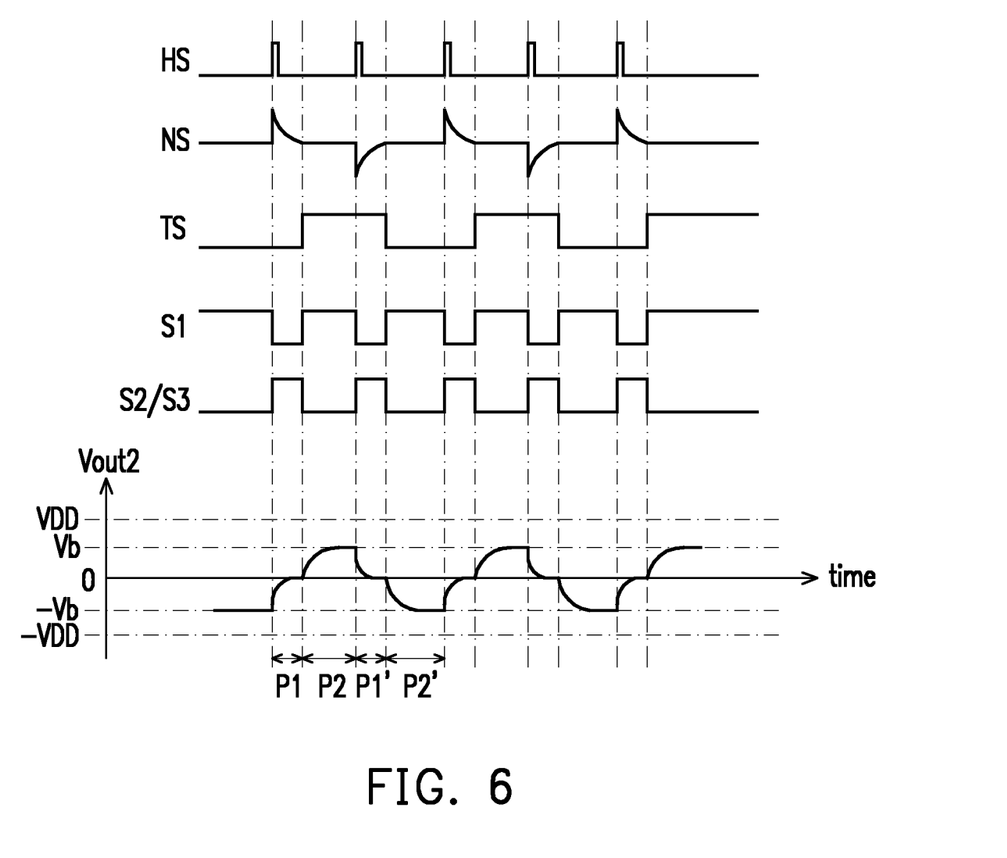
FIG. 6 is a signal waveform diagram illustrating the operation of the analog front-end circuit according to another embodiment of the disclosure.

FIG. 6 is a signal waveform diagram illustrating the operation of the analog front-end circuit according to another embodiment of the disclosure. Referring to FIG. 2, FIG. 5 and FIG. 6, in the embodiment of the disclosure, the display panel 220 may be driven by a horizontal sync signal HS, therefore the display panel 220 may synchronously generate the coupling noise signal NS which is transmitted to the analog front-end circuit 400. As shown in FIG. 6, each rising edge and each falling edge of the coupling noise signal NS may be synchronized with each rising edge of the horizontal sync signal HS. In the embodiment of the disclosure, a signal period of the horizontal sync signal HS is synchronized with an alternating period of each adjacent rising edge and falling edge of the touch driving signal TS, and the touch driving signal TS is shifted to prevent the analog front-end 410 from receiving the coupling noise signal NS at the same time during the period of the analog front-end 410 receiving the touch driving signal TS.

In the embodiment of the disclosure, the first switch 420 is configured to receive a first switching signal S1, the second switch 430 is configured to receive a second switching signal S2, and the third switch 470 is configured to receive a third switching signal S3. The first switching signal S1, the second switching signal S2 and third switching signal S3 are periodic square waves, and the first switching signal S1 and the second switching signal S2 are inverted. The second switching signal S2 and the third switching signal S3 have same waveform. Thus, the second switch 430 and the third switch 470 are turned on during first periods P1, P1', and the first switch 420 is turned on during second periods P2, P2'. The first period P1 and the second period P2 are non-overlapping, and the first period P1' and the second period P2' are non-overlapping. It is should be noted that, as shown in FIG. 6, each falling edge of the first switching signal S1 is synchronized with the each rising edge of the horizontal sync signal HS and the each falling edge and the each rising edge of the coupling noise signal NS, and each rising edge of the first switching signal S1 is synchronized with each rising edge and each falling edge of the touch driving signal TS. Thus, each rising edge of each of the second switching signal S2 and the third switching signal S3 is synchronized with the each rising edge of the horizontal sync signal HS and the each falling edge and the each rising edge of the coupling noise signal NS, and each falling edge of each of the second switching signal S2 and the third switching signal S3 is synchronized with the each rising edge and the each falling edge of the touch driving signal TS. In other words, when the coupling noise signal NS is transmitted through the panel routing L2, the first switch 420 is turned off to prevent the analog front-end 410 from receiving the coupling noise signal NS.

Therefore, as shown in FIG. 6, the analog front-end circuit 400 may release the coupling noise signal NS through the panel routing 440 and the second switch 430 to the reference voltage Vf during the first periods P1, P1', and the analog front-end 410 is configured to receive the touch driving signal TS through the panel routing 440 and the first switch 420 during the second period P2. The analog front-end 410 is configured to receive the touch driving signal TS without the coupling noise signal NS or with a relatively low coupling noise signal NS during the second period P2, so that the output terminal of the analog front-end 410 outputs an output signal Vout2 having voltage Vb as shown in FIG. 6 during the second period P2. In the embodiment of the disclosure, the analog front-end 410 is reset (or discharged) by the third switch 470 during a next first period P1', and the analog front-end 410 may continuously reset (or discharged) during a next second period P2'. It is should be noted that, the output signal Vout2 having voltage Vb may represent the touch information of the touch sensor of the touch panel 210, wherein the output signal Vout2 may swing between the voltages −Vb to Vb during the periods P1 to P2'. In other words, the analog front-end circuit 400 may be operated according to the signal waveform diagram of FIG. 6, so that the analog front-end circuit 400 can output the output signal Vout2 having higher signal-to-noise ratio during the second period P2. In addition, owing to the output signal Vout2 may swing between the voltages −Vb to Vb, the output signal Vout2 may carry more touch information during the second period P2.

Referring to FIG. 2, FIG. 5B and FIG. 6, the signal waveform of FIG. 6 may also be applied to the analog front-end circuit 600 of FIG. 5B. In the embodiment of the disclosure, the display panel 220 may be driven by the horizontal synchronization signal HS, so the display panel 220 may synchronously generate the coupling noise signal NS which is transmitted to the analog front-end circuit 600. In the embodiment of the disclosure, when the coupling noise signal NS is transmitted through the panel routing L4, the first switch 620 is turned off to prevent the analog front end 610 from receiving the coupling noise signal NS. As shown in FIG. 6, the analog front end circuit 600 may release the coupling noise signal NS to the reference voltage Vf1 through the panel routing L4 and the second switch 630 during the first period P1, P1', and the second terminal of the analog front end 610 may be used to receive the touch drive signal TS during the second period P2, so that the first output terminal of the analog front end 610 is configured to transmit the touch driving signal TS to the touch panel 210 through the first switch 620, the panel wiring L4 and the node A7 during the second period P2.

In the embodiment of the disclosure, during the second period P2, the analog front end 610 is configured to transmit the touch driving signal TS without receiving the coupling noise signal NS or receiving a relatively low coupling noise signal NS to the touch panel 210 for sensing, so that the output terminal of the analog front end 610 outputs the output signal Vout2 having the voltage Vb during the second period P2. In the embodiment of the disclosure, the analog front end 610 is reset (or discharged) by the third switch 670 during the next first period P1', and the analog front end 610 may be continuously reset (or discharged) during the next second period P2'. It should be noted that, the output signal Vout2 having the voltage Vb may represent the touch information of the touch sensor of the touch panel 210, where the output signal Vout2 may swing from the voltage −Vb to the voltage Vb during the period P1 to the period P2'. In other words, the analog front-end circuit 600 may be operated according to the signal waveform diagram of FIG. 6, so that the analog front-end circuit 600 may output the output signal Vout2 with a higher signal-to-noise ratio during the second period P2. In addition, during the second period P2, since the output signal Vout2 may swing from the voltage −Vb to the voltage Vb, the output signal Vout2 may carry more touch information. The voltage Vb is, for example, less than the power supply voltage VDD, and the voltage −Vb is, for example, greater than the power supply voltage −VDD.

However, regarding the signal waveform characteristics of this embodiment (FIG. 5B and FIG. 6), please refer to the above embodiment (FIG. 5A and FIG. 6) to obtain sufficient teaching, suggestion, and implementation description, so there will not repeat again. In addition, FIG. 5A and FIG. 5B may have different voltage oscillations when the signal waveform of FIG. 6 is applied. The signal waveform of FIG. 6 is only used to show the relationships between the switching result of each switch and the change of each signal waveform, and do not limit the analog front-end circuits 400 and 600 of FIG. 5A and FIG. 5B to operate with the same voltage amplitude results.

Figure 7:
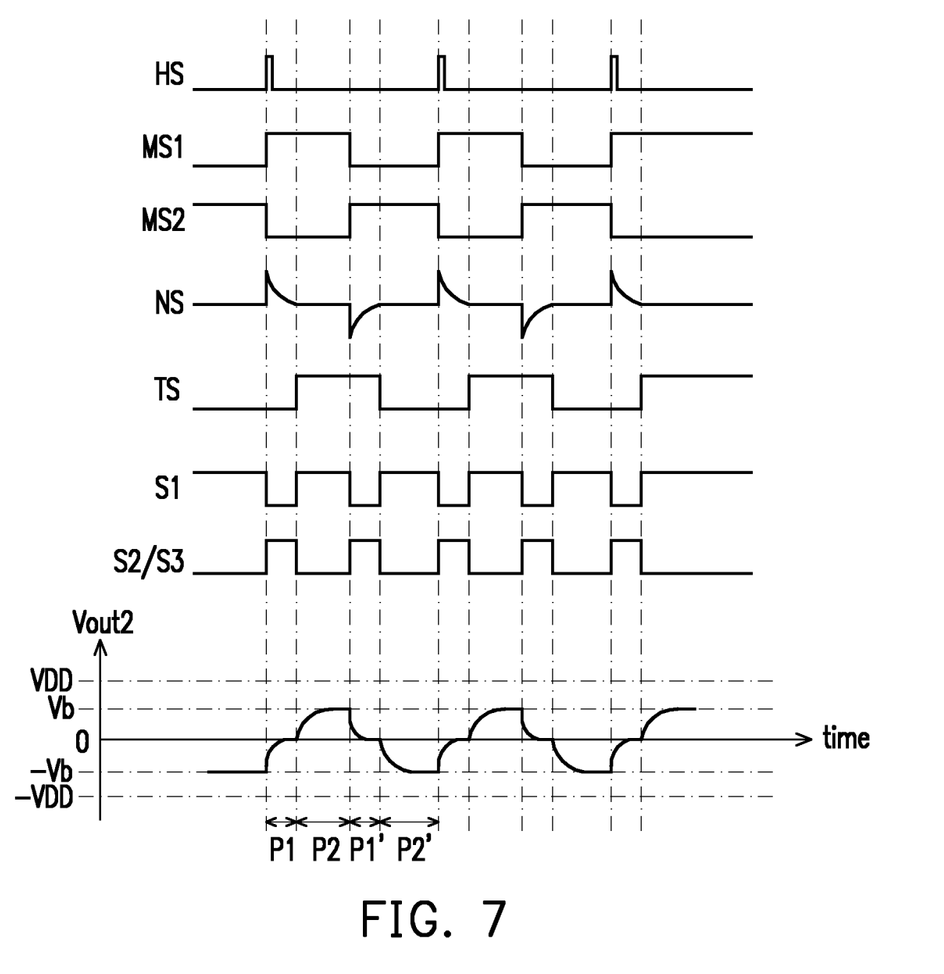
FIG. 7 is a signal waveform diagram illustrating the operation of the analog front-end circuit according to yet another embodiment of the disclosure.

FIG. 7 is a signal waveform diagram illustrating the operation of the analog front-end circuit according to yet another embodiment of the disclosure. Referring to FIG. 2, FIG. 5A and FIG. 7, the signal waveform of FIG. 7 may be applied to the analog front-end circuit 400 of FIG. 5A. In the embodiment of the disclosure, the analog front-end circuit 400 may be act in concert with the multiplexers 221, 222. In the embodiment of the disclosure, the display panel 220 may be driven by a horizontal sync signal HS. The multiplexer 221 may be controlled by a multiplexer control signal MS1, and the multiplexer 222 may be controlled by a multiplexer control signal MS2. The multiplexer 221 may be controlled by a multiplexer control signal MS1, and the multiplexer 222 may be controlled by a multiplexer control signal MS2. The multiplexer control signals MS1, MS2 are periodic square waves, and multiplexer control signals MS1, MS2 are inverted. Therefore, as shown in FIG. 7, in response to the horizontal sync signal HS and the switching operation of the multiplexers 221, 222, the display panel 220 may synchronously generate the coupling noise signal NS to the analog front-end circuit 400. In other words, the coupling noise signal NS may include noises from the switching operation of the multiplexers 221, 222. As shown in FIG. 7, each rising edge and each falling edge of the coupling noise signal NS may be synchronized with each rising edge and each falling edge of the multiplexer control signals MS1, MS2. In the embodiment of the disclosure, a signal period of the horizontal sync signal HS may be synchronized with a signal period of the touch driving signal TS, and the touch driving signal TS be shifted to prevent the analog front-end 410 from receiving the coupling noise signal NS during the period of the analog front-end 410 receiving the touch driving signal TS.

In the embodiment of the disclosure, the first switch 420 is configured to receive a first switching signal S1, the second switch 430 is configured to receive a second switching signal S2, and the third switch 430 is configured to receive a third switching signal S3. The first switching signal S1, the second switching signal S2 and third switching signal S3 are periodic square waves, and the first switching signal S1 and the second switching signal S2 are inverted. The second switching signal S2 and the third switching signal S3 have same waveform. Thus, the second switch 430 and the third switch 470 are turned on during first periods P1, P1', and the first switch 420 is turned on during second periods P2, P2'. The first periods P1, P1' and the second periods P2, P2' are non-overlapping. It is should be noted that, as shown in FIG. 7, each interval falling edge of the first switching signal S1 is synchronized with each rising edge of the horizontal sync signal HS, and each rising edge of the first switching signal S1 is synchronized with the each rising edge and each falling edge of the touch driving signal TS. Further, the each falling edge of the first switching signal S1 is synchronized with each falling edge and each rising edge of the multiplexer control signals MS1, MS2 and the coupling noise signal NS. Thus, each interval rising edge of the second switching signal S2 and the third switching signal S3 is synchronized with the each rising edge of the horizontal sync signal HS, and each falling edge of the second switching signal S2 and the third switching signal S3 is synchronized with the each rising edge and the each falling edge of the touch driving signal TS. Further, the each rising edge of the second switching signal S2 and the third switching signal S3 is synchronized with the each rising edge and the each falling edge of the multiplexer control signals MS1, MS2 and the coupling noise signal NS. In other words, when the coupling noise signal NS is transmitted through the panel routing L2, the first switch 420 is turned off to prevent the analog front-end 410 from receiving the coupling noise signal NS.

Therefore, as shown in FIG. 7, the analog front-end circuit 400 may release the coupling noise signal NS through the panel routing 440 and the second switch 430 to the reference voltage Vf during the first periods P1, P1', and the analog front-end 410 is configured to receive the touch driving signal TS through the panel routing 440 and the first switch 420 during the second period P2. The analog front-end 410 is configured to receive the touch driving signal TS without the coupling noise signal NS or with a relatively low coupling noise signal NS during the second period P2, so that the output terminal of the analog front-end 410 outputs an output signal Vout2 having voltage Vb as shown in FIG. 7 during the second period P2. In the embodiment of the disclosure, the analog front-end 410 is reset (or discharged) by the third switch 470 during a next first period P1', and the analog front-end 410 may continuously reset (or discharged) during a next second period P2'. It is should be noted that, the output signal Vout2 having voltage Vb may represent the touch information of the touch sensor of the touch panel 210, wherein the output signal Vout2 may swing between the voltages −Vb to Vb. In other words, the analog front-end circuit 400 may be operated according to the signal waveform diagram of FIG. 7, so that the analog front-end circuit 400 can output the output signal Vout2 having higher signal-to-noise ratio during the second period P2. In addition, owing to the output signal Vout2 may swing between the voltages −Vb to Vb, the output signal Vout2 may carry more touch information during the second period P2.

Referring to FIG. 2, FIG. 5B and FIG. 7, the signal waveform of FIG. 7 may be applied to the analog front-end circuit 600 of FIG. 5B. In the embodiment of the disclosure, the analog front-end circuit 600 may act in concert with the multiplexers 221 and 222. In the embodiment of the disclosure, the display panel 220 may be driven by the horizontal synchronization signal HS. The multiplexer 221 may be controlled by the multiplexer control signal MS1, and the multiplexer 222 may be controlled by the multiplexer control signal MS2. In the embodiment of the disclosure, in response to the horizontal synchronization signal HS and the switching operations of the multiplexers 221 and 222, the display panel 220 may synchronously generate the coupling noise signal NS which is transmitted to the analog front-end circuit 600. In other words, the coupling noise signal NS may include noise from the switching operations of the multiplexers 221 and 222. In the embodiment of the disclosure, when the coupling noise signal NS is transmitted through the panel wiring L2, the first switch 620 is turned off to prevent the analog front end 610 from receiving the coupling noise signal NS.

In the embodiment of the disclosure, the first end of the analog front end 610 is used to transmit the driving signal TS to the touch panel 210 for sensing during the second period P2 without receiving the coupling noise signal NS or receiving a relatively low coupling noise signal NS, so that the output terminal of the analog front end 610 outputs the output signal Vout2 having the voltage Vb during the second period P2. In the embodiment of the disclosure, the analog front end 610 is reset (or discharged) by the third switch 670 during the next first period P1', and the analog front end 610 may be continuously reset (or discharged) during the next second period P2'. It should be noted that, the output signal Vout2 having the voltage Vb may represent the touch information of the touch sensor of the touch panel 210, where the output signal Vout2 may swing from the voltage −Vb to the voltage Vb. In other words, the analog front-end circuit 600 may operate according to the signal waveform diagram of FIG. 7, so that the analog front-end circuit 600 may output the output signal Vout2 with a higher signal-to-noise ratio during the second period P2. In addition, during the second period P2, since the output signal Vout2 may swing from the voltage −Vb to the voltage Vb, the output signal Vout2 may carry more touch information.

However, regarding the signal waveform characteristics of this embodiment (FIG. 5B and FIG. 7), please refer to the above-mentioned embodiment (FIG. 5A and FIG. 7) to obtain sufficient teaching, suggestion, and implementation description, so there will not repeat again. In addition, FIG. 5A and FIG. 5B may have different voltage oscillations when the signal waveform of FIG. 7 is applied. The signal waveform of FIG. 7 is only used to show the relationships between the switching results of each off and on and the change of each signal waveform. It is not a limitation that the analog front-end circuits 400 and 600 of FIG. 5A and FIG. 5B use the same voltage amplitude result to operate.

Figure 8:
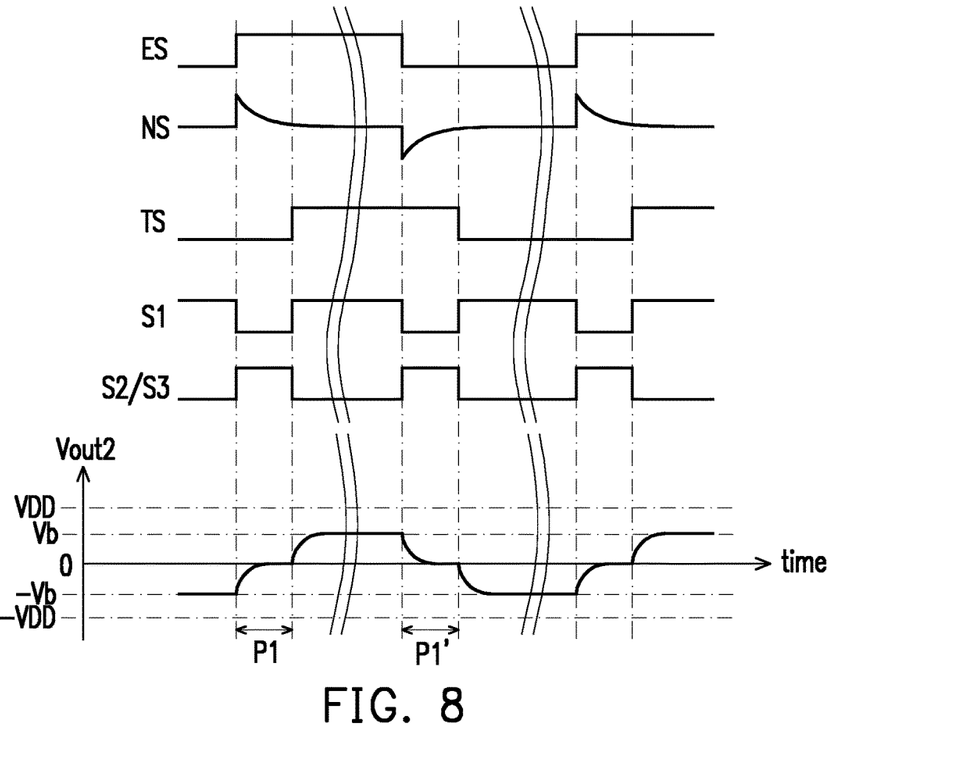
FIG. 8 is a signal waveform diagram illustrating the operation of the analog front-end circuit according to yet again another embodiment of the disclosure.

FIG. 8 is a signal waveform diagram illustrating the operation of the analog front-end circuit according to yet again another embodiment of the disclosure. Referring to FIG. 2, FIG. 5A and FIG. 8, in the embodiment of the disclosure, the analog front-end circuit 400 may be act in concert with the transistor 232 of FIG. 2 receiving the emission signal ES. In the embodiment of the disclosure, the pixel unit 230 may be driven by the emission signal ES. It is should be noted that, owing to a frame rate of touch panel 210 is higher than a frame rate of the display panel 220, one signal period of the emission signal ES is longer than one signal period of the touch driving signal TS. Therefore, as shown in FIG. 8, in response to the emission signal ES, the display panel 220 may synchronously generate the coupling noise signal NS to the analog front-end circuit 400. In other words, the coupling noise signal NS may include noises from the driven operation of the pixel unit 230. As shown in FIG. 8, each rising edge and each falling edge of the coupling noise signal NS may be synchronized with each rising edge and each falling edge of the emission signal ES. In the embodiment of the disclosure, a signal period of the emission signal ES may be synchronized with N times of a signal period of the touch driving signal TS, and the waveform of the touch driving signal TS may be shifted to prevent the analog front-end 410 from receiving the coupling noise signal NS during the period of the analog front-end 410 receiving the touch driving signal TS, wherein N is a positive integer.

In the embodiment of the disclosure, the first switch 420 is configured to receive a first switching signal S1, the second switch 430 is configured to receive a second switching signal S2, and the third switch 470 is configured to receive a third switching signal S3. The first switching signal S1, the second switching signal S2 and third switching signal S3 are periodic square waves, and the first switching signal S1 and the second switching signal S2 are inverted. The second switching signal S2 and the third switching signal S3 have same waveform. Thus, the second switch 430 and the third switch 470 are turned on during first periods P1, P1', and the first switch 420 and the third switch 470 are turned on during second periods (similar to the second periods P2, P2' of FIG. 6 or FIG. 7). The first periods P1, P1' and the above second periods are non-overlapping. It is should be noted that, as shown in FIG. 7, each N-th falling edge of the first switching signal S1 is synchronized with the each falling edge and the each rising edge of the emission signal ES and the coupling noise signal NS, and each rising edges of the first switching signal S1 is synchronized with each falling edge and each rising edge of the touch driving signal TS, where N is a positive integer. Thus, each N-th rising edge of each of the second switching signal S2 and the third switching signal S3 is synchronized with the each falling edge and the each rising edge of the emission signal ES and the coupling noise signal NS, and each rising edge of each of the second switching signal S2 and the third switching signal S3 is synchronized with the each falling edge and the each rising edge of the touch driving signal TS. In other words, when the coupling noise signal NS is transmitted through the panel routing L2, the first switch 420 is turned off to prevent the analog front-end 410 from receiving the coupling noise signal NS.

Therefore, as shown in FIG. 8, the analog front-end circuit 400 may release the coupling noise signal NS through the panel routing 440 and the second switch 430 to the reference voltage Vf during the first periods P1, P1', and the analog front-end 410 is configured to receive the touch driving signal TS through the panel routing 440 and the first switch 420 during the second period (similar to the second period P2 of FIG. 6 or FIG. 7). The analog front-end 410 is configured to receive the touch driving signal TS without the coupling noise signal NS or with a relatively low coupling noise signal NS during the second period (similar to the second period P2 of FIG. 6 or FIG. 7), so that the output terminal of the analog front-end 410 outputs an output signal Vout2 having voltage Vb as shown in FIG. 8 during the second period (similar to the second period P2 of FIG. 6 or FIG. 7). In the embodiment of the disclosure, the analog front-end 410 is reset (or discharged) by the third switch 470 during a next first period P1', and the analog front-end 410 may continuously reset (or discharged) during a next second period (similar to the second period P2' of FIG. 6 or FIG. 7). It is should be noted that, the output signal Vout2 having voltage Vb may represent the touch information of the touch sensor of the touch panel 210, wherein the output signal Vout2 may swing between the voltages –Vb to Vb. In other words, the analog front-end circuit 400 may be operated according to the signal waveform diagram of FIG. 8, so that the analog front-end circuit 400 can output the output signal Vout2 having higher signal-to-noise ratio during the second period P2 (similar to the second period P2 of FIG. 6 or FIG. 7). In addition, owing to the output signal Vout2 may swing between the voltages –Vb to Vb, the output signal Vout2 may carry more touch information during the second period P2.

Referring to FIG. 2, FIG. 5B and FIG. 8, the signal waveform of FIG. 8 may also be applied to the analog front-end circuit 600 of FIG. 5B. In the embodiment of the disclosure, the analog front-end circuit 600 may act in concert with the transistor 232 for receiving the emission signal ES. In the embodiment of the disclosure, the pixel unit 230 may be driven by the emission signal ES. It should be noted that, since the image update rate of the touch panel 210 is higher than the image update rate of the display panel 220, one signal period of the emission signal ES is longer than one signal period of the touch drive signal TS. In the embodiment of the disclosure, in response to the emission signal ES, the display panel 220 may synchronously generate the coupling noise signal NS which is transmitted to the analog front-end circuit 600. In other words, the coupling noise signal NS may include noise from the driving operation of the pixel unit 230. In the embodiment of the disclosure, when the coupling noise signal NS is transmitted through the panel wiring L4, the first switch 620 is turned off to prevent the analog front end 610 from receiving the coupling noise signal NS.

In the embodiment of the disclosure, the first end of the analog front end 610 is used to transmit the touch driving signal TS to the touch panel 210 for sensing during the second period (similar to the second period P2 shown in FIG. 6 or FIG. 7) without receiving the coupling noise signal NS or receiving relatively low coupling noise signal NS, so that the output terminal of the analog front end 610 outputs an output signal Vout2 having a voltage Vb during the second period (similar to the second period P2 shown in FIG. 6 or FIG. 7). In the embodiment of the disclosure, the analog front end 410 is reset (or discharged) through the third switch 470 during the next first period P1', and may be reset (or discharged) in the next second period (similar to the second period P2' shown in FIG. 6 or FIG. 7), the analog front end 410 is continuously reset (or discharged). It should be noted that, the output signal Vout2 having the voltage Vb may represent the touch information of the touch sensor of the touch panel 210, where the output signal Vout2 may swing from the voltage –Vb to the voltage Vb. In other words, the analog front-end circuit 600 may operate according to the signal waveform diagram of FIG. 8, so that during the second period P2 (similar to the second period P2' shown in FIG. 6 or FIG. 7), the output of the analog front-end circuit 600 may be higher than the output signal Vout2 of the signal-to-noise ratio. In addition, during the second period P2, since the output signal Vout2 may swing from the voltage –Vb to the voltage Vb, the output signal Vout2 may carry more touch information.

However, regarding the signal waveform characteristics of this embodiment (FIG. 5B and FIG. 8), please refer to the above-mentioned embodiment (FIG. 5A and FIG. 8) to obtain sufficient teaching, suggestion, and implementation description, so there will not repeat again. In addition, the embodiments of FIG. 5A and FIG. 5B may have different voltage vibrations when the signal waveform of FIG. 8 is applied. The signal waveform of FIG. 8 is only used to show the relationships between the switching results of each off and on and the change of each signal waveform. It is not a limitation that, the analog front-end circuits 400 and 600 of FIG. 5A and FIG. 5B use the same voltage amplitude result to operate.

It is should be noted that, in some embodiments of the disclosure, the signal waveform diagrams of FIG. 7 and FIG. 8 may also be applied to the analog front-end circuit 300 of FIG. 3A and FIG. 3B except for the signal waveform of the third switching signal S3. Moreover, based on the teachings of embodiments of FIG. 4, FIG. 6 to FIG. 8, in another some embodiments of the disclosure, the switches in the analog front-end circuit 300 and 500 of FIG. 3A and FIG. 3B or the analog front-end circuit 400 and 600 of FIG. 5A and FIG. 5B may also be act in concert with the horizontal sync signal, the multiplexers and the transistor receiving the emission signal synchronously.

Figure 9:
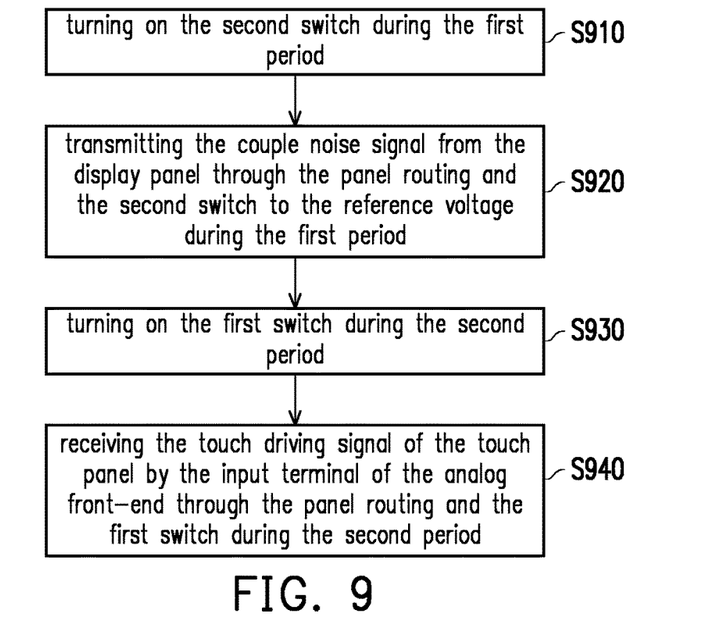
FIG. 9 is a flowchart of an operating method according to an embodiment of the disclosure.

FIG. 9 is a flowchart of an operating method according to an embodiment of the disclosure. Referring to FIG. 2, FIG. 3A and FIG. 9, the operating method of the embodiment may be adapted to the analog front-end circuit 300, 400, 500 or 600 of FIG. 3A, FIG. 3B, FIG. 5A or FIG. 5B. However, the following description uses the analog front-end circuit 300 of FIG. 3A as an example. In step S910, the analog front-end circuit 300 turns on the second switch 330 during the first period. In step S920, the coupling noise signal NS from the display panel 220 is transmitted through the panel routing L1 and the second switch 330 to the reference voltage Vf during the first period. In step S930, the analog front-end circuit 300 turns on the first switch 320 during a second period. In step S940, the input terminal of the analog front-end 310 receives a touch driving signal TS during the second period. In the embodiment of the disclosure, the first period and the second period are non-overlapping. Therefore, the analog front-end circuit 300 performing step S910 to S940 may prevent the analog front-end 310 from receiving the coupling noise signal NS by controlling the conduction states of the first switch 320 and the second switch 330.

In addition, the relevant circuit features, implementation details, and related technical features of the analog front-end circuit 300 may obtain sufficient teachings, suggestions, and implementation descriptions based on the description of the above-mentioned embodiments of FIG. 1 to FIG. 8, and there will not repeat again. Furthermore, it is similar to the above description using FIG. 3A as the example, the above steps S910 to S940 can also be applied to be executed by the analog front-end circuits 400, 500, and 600 of FIG. 3B, FIG. 5A, and FIG. 5B, and there will not be repeat again.

In summary, according to the analog front-end circuit for the touch controller and the operating method thereof of the disclosure, by controlling the conduction states of the switches disposed between the panel routing and the analog front-end, the analog front-end circuit can effectively avoid to receive the noise signal generated by the display panel when the analog front-end circuit receives the touch driving signal. Moreover, in some embodiments of the disclosure, the output signal of the analog front-end circuit may further has a wide voltage swing so as to carry more touch information.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An analog front-end circuit for a touch controller, comprising:
    an analog front-end, comprising an input terminal and an output terminal;
    a first switch, comprising a first terminal and a second terminal, wherein the first terminal of the first switch is coupled to the input terminal of the analog front-end, and the second terminal of the first switch is configured to receive a touch driving signal from a panel routing; and
    a second switch, comprising a first terminal and a second terminal, wherein the first terminal of the second switch is coupled to the second terminal of the first switch, and the second terminal of the second switch is coupled to a reference voltage,
    wherein the first switch is configured to receive a first switching signal to turn on the first switch, and the second switch is configured to receive a second switching signal to turn on the second switch, wherein the first switching signal and the second switching signal are periodic square waves, and the first switching signal and the second switching signal are inverted.

2. The analog front-end circuit according to the claim 1, wherein the second switch is turned on during a first period, and the first switch is turned on during a second period, wherein the first period and the second period are non-overlapping.

3. The analog front-end circuit according to the claim 1, wherein the panel routing is further coupled to a touch panel and a display panel, and the input terminal of the analog front-end receives the touch driving signal of the touch panel through the panel routing and the first switch during the second period.

4. The analog front-end circuit according to the claim 3, wherein the display panel is a micro LED display.

5. The analog front-end circuit according to the claim 3, wherein the touch panel is a mutual capacitance touch panel or a self-capacitance touch panel.

6. The analog front-end circuit according to the claim 3, wherein an alternating period of each adjacent rising edge and falling edge of the touch driving signal are synchronized with a signal period of a horizontal sync signal of the display panel.

7. The analog front-end circuit according to the claim 6, wherein each falling edge of the first switching signal is synchronized with each rising edge of the horizontal sync signal.

8. The analog front-end circuit according to the claim 3, wherein each rising edge of the first switching signal is synchronized with each rising edge and each falling edge of the touch driving signal.

9. The analog front-end circuit according to the claim 3, wherein a couple noise signal from the display panel is transmitted through the panel routing and the second switch to the reference voltage during the first period.

10. The analog front-end circuit according to the claim 9, wherein each falling edge of the first switching signal is synchronized with each rising edge and each falling edge of the coupling noise signal of the display panel.

11. The analog front-end circuit according to the claim 3, wherein a signal period of the touch driving signal is equal to a signal period of a horizontal sync signal of the display panel.

12. The analog front-end circuit according to the claim 3, wherein each falling edge of the first switching signal is synchronized with each rising edge and each falling edge of a multiplexer control signal of the display panel.

13. The analog front-end circuit according to the claim 3, wherein N times of a signal period of the touch driving signal is equal to a signal period of an emission signal of the display panel, wherein N is a positive integer.

14. The analog front-end circuit according to the claim 11 wherein each N-th falling edge of the first switching signal is synchronized with each falling edge and each rising edge of the emission signal.

15. The analog front-end circuit according to the claim 3, wherein the input terminal of the analog front-end receives the touch driving signal of the touch panel through the panel routing and the first switch during the second period.

16. The analog front-end circuit according to the claim 3, wherein the input terminal of the analog front-end comprises a first input terminal and a second input terminal,
wherein the second input terminal of the analog front end receives the touch driving signal during the second period, and the first input terminal of the analog front end sends the touch driving signal to the touch panel through the panel routing and the first switch during the second period.

17. The analog front-end circuit according to the claim 1, further comprising:
a third switch, comprising a first terminal and a second terminal, wherein the first terminal of the third switch is coupled to the input terminal of the analog front-end and the second terminal of the third switch is coupled to the output terminal of the analog front-end,
wherein the third switch is switched synchronously with the second switch.

18. The analog front-end circuit according to the claim 1, further comprising:
a third switch, comprising a first terminal and a second terminal, wherein the first terminal of the third switch is coupled to another reference voltage and the second terminal of the third switch is coupled to the output terminal of the analog front end,
wherein the third switch and the second switch are switched synchronously.

19. The analog front-end circuit according to the claim 1, wherein the reference voltage is a common mode voltage or the touch driving signal.

20. An operating method of an analog front-end circuit for a touch controller, wherein the analog front-end circuit comprises an analog front-end, a first switch and a second switch, an input terminal of the analog front-end is coupled to a first terminal of the first switch, a second terminal of the first switch is coupled to a panel routing and a first terminal of the second switch, a second terminal of the second switch is coupled to a reference voltage, and the panel routing is further coupled to a touch panel and a display panel, wherein the operating method comprises:
receiving, by the first switch, a first switching signal;
receiving, by the second switch, a second switching signal, wherein the first switching signal and the second switching signal are periodic square waves, and the first switching signal and the second switching signal are inverted;
transmitting a coupling noise signal from the display panel through the panel routing and the second switch to the reference voltage when the second switch is turned on by a second switching signal; and
receiving a touch driving signal by the input terminal of the analog front-end through the panel routing and the first switch when the first switch is turned on by a first switching signal.

21. The operating method according to the claim 20, wherein an alternating period of each adjacent rising edge and falling edge of the touch driving signal are synchronized with a signal period of a horizontal sync signal of the display panel.

22. The operating method according to the claim 21, wherein each falling edge of the first switching signal is synchronized with each rising edge of the horizontal sync signal.

23. The operating method according to the claim 20, wherein each rising edge of the first switching signal is synchronized with each rising edge and each falling edge of the transmitter driving signal.

24. The operating method according to the claim 20, wherein each falling edge of the first switching signal is synchronized with each rising edge and each falling edge of the coupling noise signal of the display panel.

25. The operating method according to the claim 20, wherein a signal period of the touch driving signal is equal to a signal period of a horizontal sync signal of the display panel.

26. The operating method according to the claim 20, wherein a falling edge of the first switching signal is synchronized with each rising edge and each falling edge of a multiplexer control signal of the display panel.

27. The operating method according to the claim 20, wherein N times of a signal period of the touch driving signal is equal to a signal period of an emission signal of the display panel, wherein N is a positive integer.

28. The operating method according to the claim 27, wherein each N-th falling edge of the first switching signal is synchronized with each falling edge and each rising edge of the emission signal.

29. The operating method according to the claim 20, wherein the analog front-end circuit further comprises a third switch, and a first terminal of the third switch is coupled to the input terminal of the analog front-end, and a second terminal of the third switch is coupled to the output terminal of the analog front-end, wherein the third switch is switched synchronously with the second switch.

30. The operating method according to the claim 20, wherein the reference voltage is a common mode voltage or the touch driving signal.

31. The operating method according to the claim 20, wherein the input terminal of the analog front-end comprises a first input terminal and a second input terminal, and the step of receiving the touch driving signal by the input terminal of the analog front-end comprises:
receiving the touch driving signal by the second input terminal of the analog front end during the second period, and sending the touch driving signal to the touch panel by the first input terminal of the analog front end through the first switch and the panel routing during the second period.

* * * * *